US012632722B2

(12) United States Patent
Nitta et al.

(10) Patent No.: US 12,632,722 B2
(45) Date of Patent: May 19, 2026

(54) DISPLAYING ITERATIVE LEARNING PROCESS AND SAMPLE ERROR TO EFFICIENTLY ELIMINATE NOISY SAMPLE DATA

(71) Applicant: KABUSHIKI KAISHA TOSHIBA, Tokyo (JP)

(72) Inventors: Shuhei Nitta, Tokyo (JP); Atsushi Yaguchi, Tokyo (JP); Yukinobu Sakata, Kawasaki (JP); Akiyuki Tanizawa, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1320 days.

(21) Appl. No.: 17/186,323

(22) Filed: Feb. 26, 2021

(65) Prior Publication Data

US 2022/0076116 A1 Mar. 10, 2022

(30) Foreign Application Priority Data

Sep. 9, 2020 (JP) ................................. 2020-151050

(51) Int. Cl.
*G06N 3/08* (2023.01)
*G06F 18/214* (2023.01)

(52) U.S. Cl.
CPC ............. *G06N 3/08* (2013.01); *G06F 18/214* (2023.01)

(58) Field of Classification Search
CPC ................................ G06N 3/08; G06F 18/214
See application file for complete search history.

(56) References Cited

U.S. PATENT DOCUMENTS

| | | | | |
|---|---|---|---|---|
| 11,556,742 B2 * | 1/2023 | Levanony | .............. | G16H 30/40 |
| 11,556,746 B1 * | 1/2023 | Dasgupta | ................ | G06N 5/04 |
| 11,676,033 B1 * | 6/2023 | Menon | ................... | G06N 3/084 |
| | | | | 706/20 |

FOREIGN PATENT DOCUMENTS

| | | |
|---|---|---|
| JP | 5-250164 A | 9/1993 |
| JP | 2014-142871 A | 8/2014 |
| JP | 2017-162232 A | 9/2017 |

OTHER PUBLICATIONS

Shen, Yanyao, and Sujay Sanghavi. "Learning with bad training data via iterative trimmed loss minimization." International Conference on Machine Learning. PMLR, 2019. (Year: 2019).*

* cited by examiner

*Primary Examiner* — Casey R. Garner
(74) *Attorney, Agent, or Firm* — Oblon, McClelland, Maier & Neustadt, L.L.P.

(57) ABSTRACT

According to one embodiment, a learning apparatus includes processing circuitry. The processing circuitry acquires a plurality of learning samples to be learned and a plurality of target labels associated with the respective learning samples, iteratively learns a learning model so that a learning error between output data corresponding to the learning sample and the target label is small with respect to the learning model to which the output data is output by inputting the learning sample, and displays a layout image in which at least some of the learning samples are arranged based on a learning progress regarding the iterative learning of the learning model and a plurality of the learning errors.

18 Claims, 11 Drawing Sheets

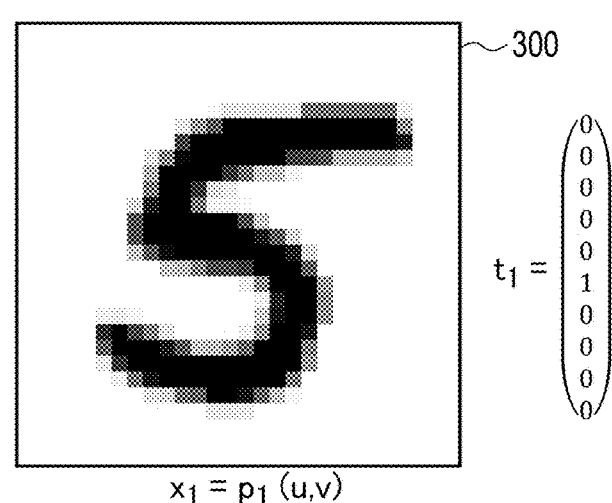
$$t_1 = \begin{pmatrix} 0 \\ 0 \\ 0 \\ 0 \\ 1 \\ 0 \\ 0 \\ 0 \\ 0 \\ 0 \end{pmatrix}$$
F I G. 3
$x_1 = p_1(u,v)$
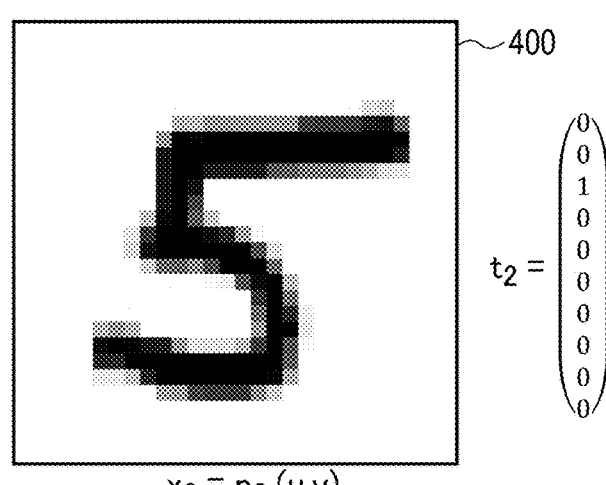
$$t_2 = \begin{pmatrix} 0 \\ 0 \\ 1 \\ 0 \\ 0 \\ 0 \\ 0 \\ 0 \\ 0 \\ 0 \end{pmatrix}$$
F I G. 4
$x_2 = p_2(u,v)$
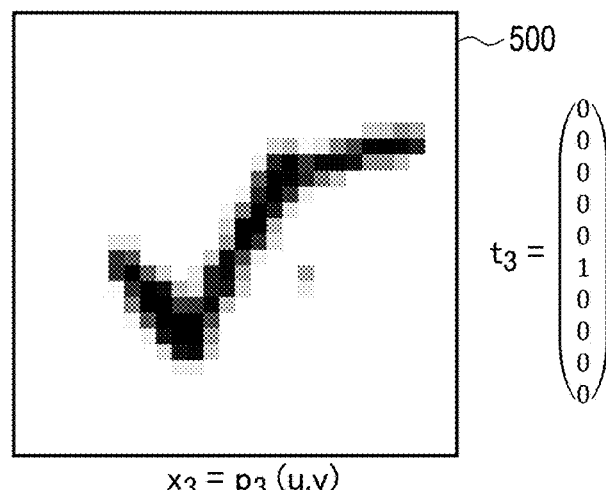
$$t_3 = \begin{pmatrix} 0 \\ 0 \\ 0 \\ 0 \\ 0 \\ 1 \\ 0 \\ 0 \\ 0 \\ 0 \end{pmatrix}$$
F I G. 5
$x_3 = p_3(u,v)$ 600
610
611  612
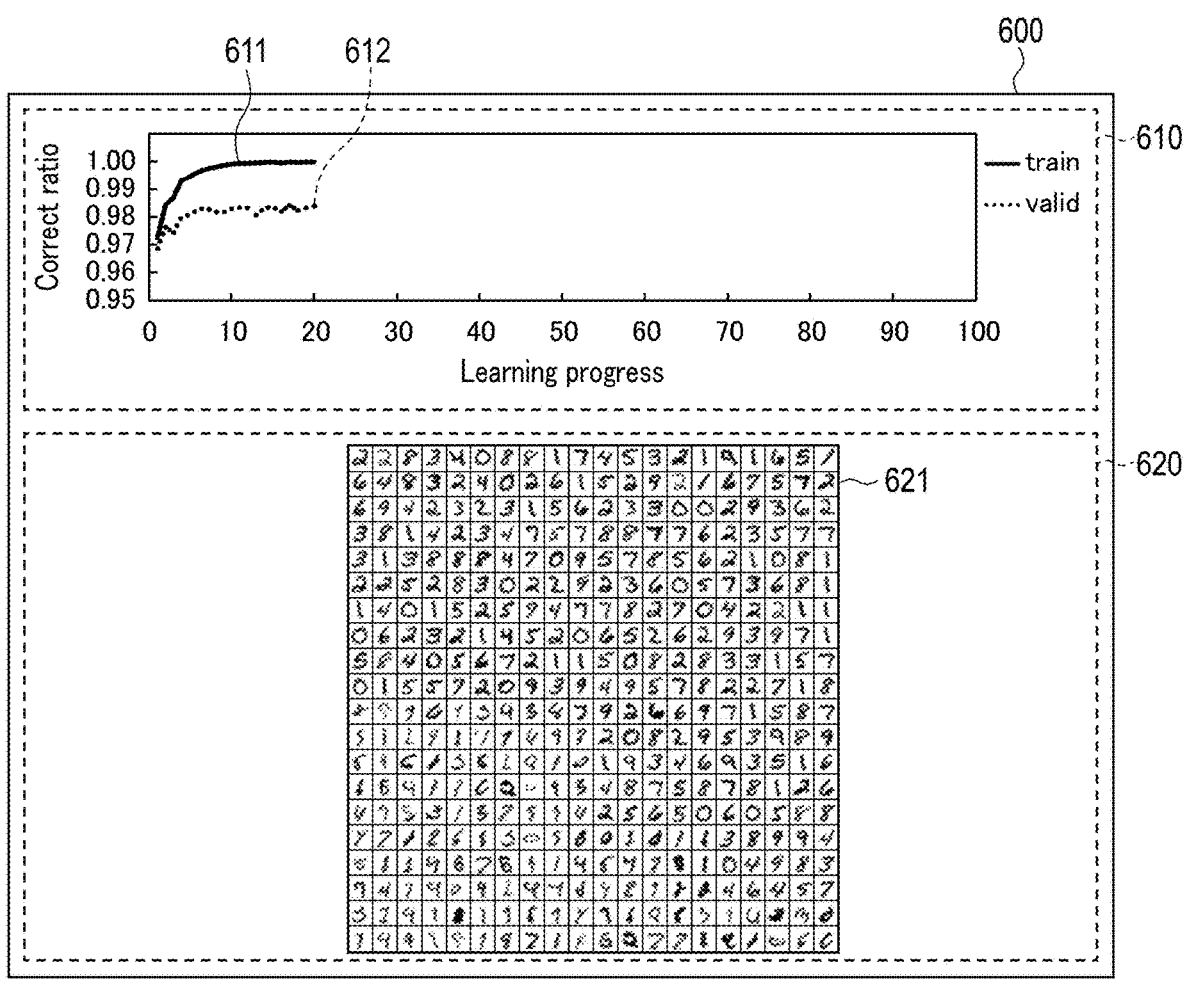
621
620
FIG. 6
Learning progress
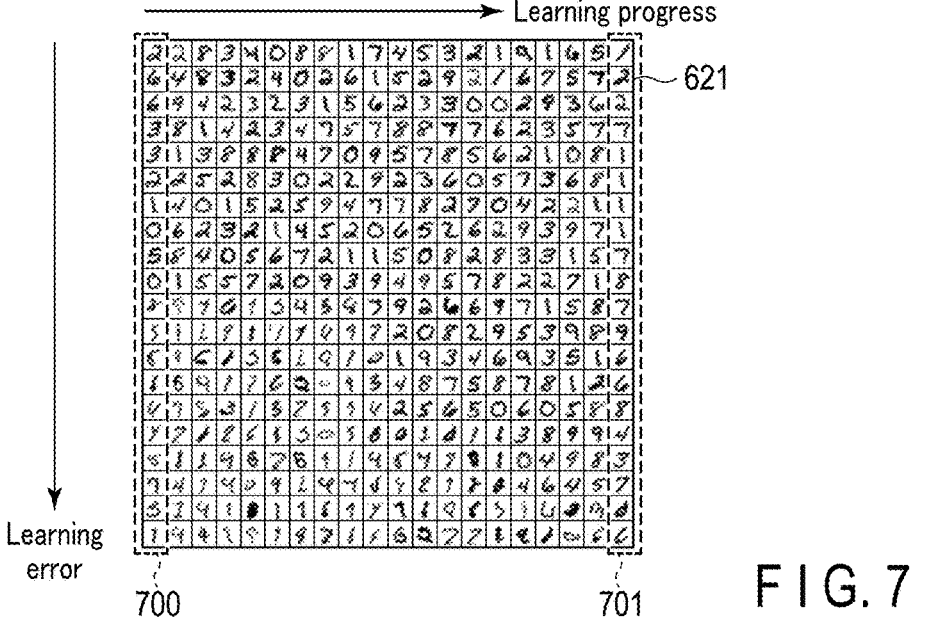
621
Learning
error
700    701    FIG. 7

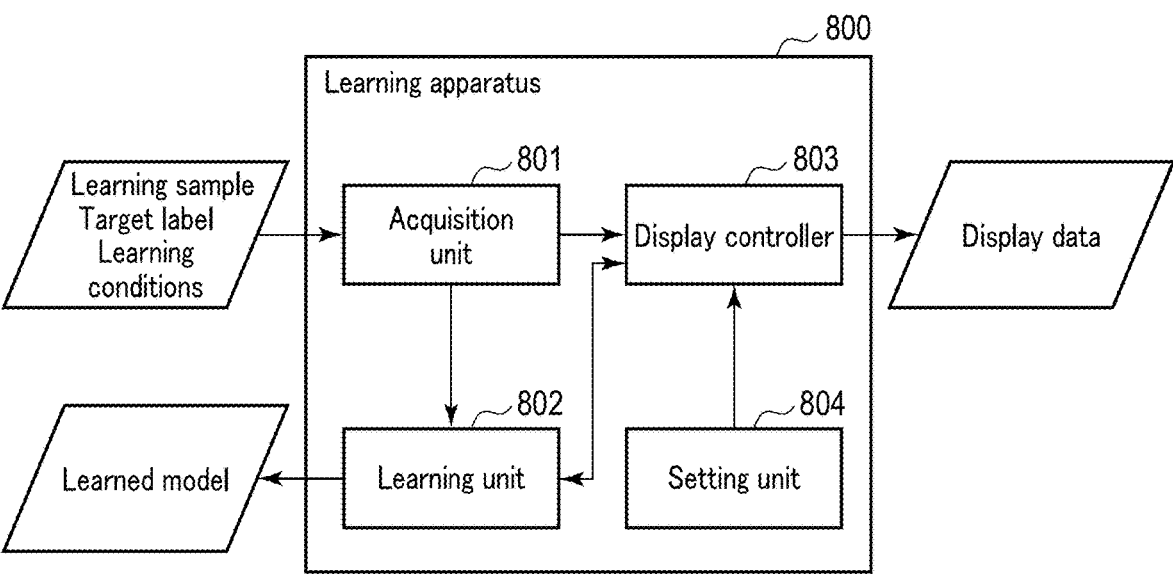
F I G. 8

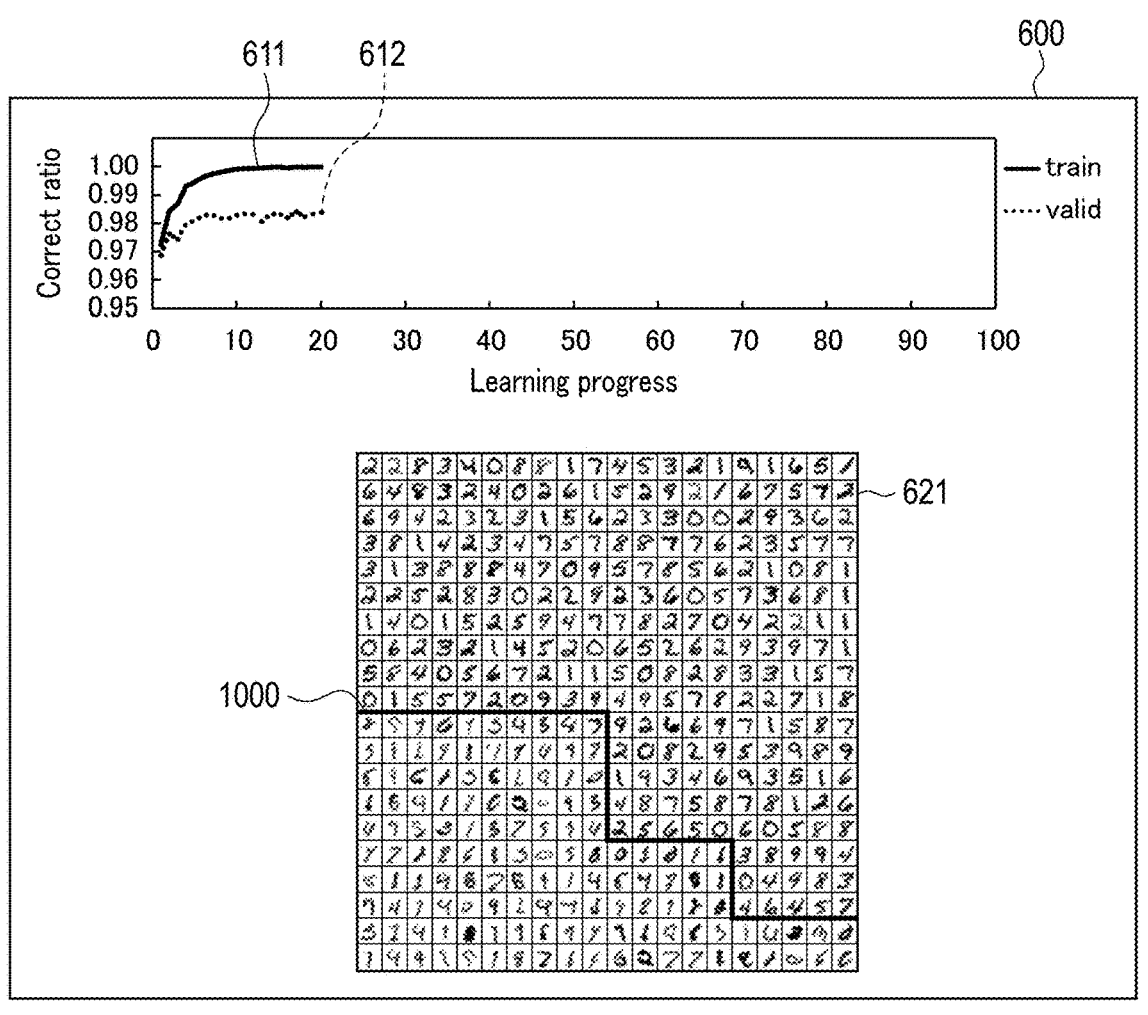
F I G. 10
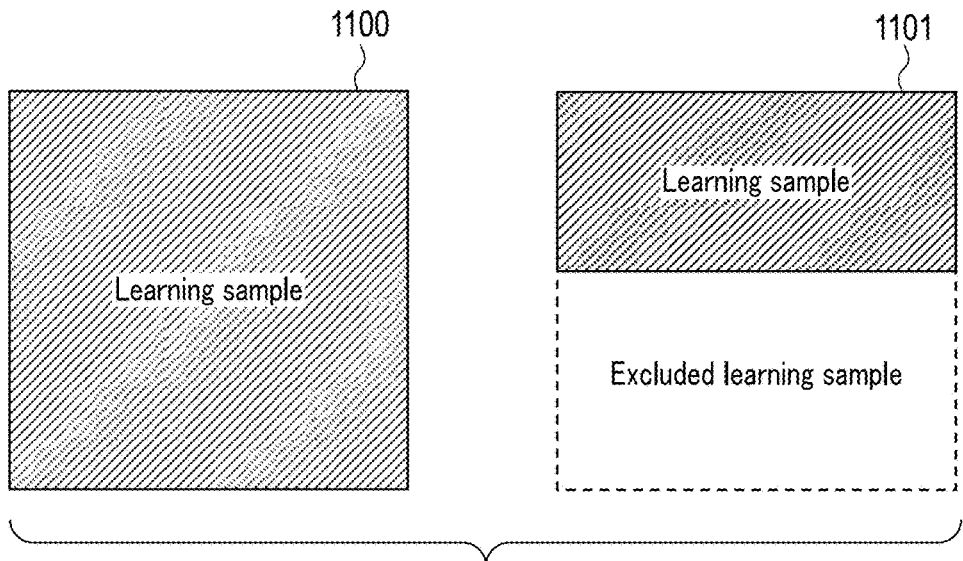
F I G. 11

1200
620
1210
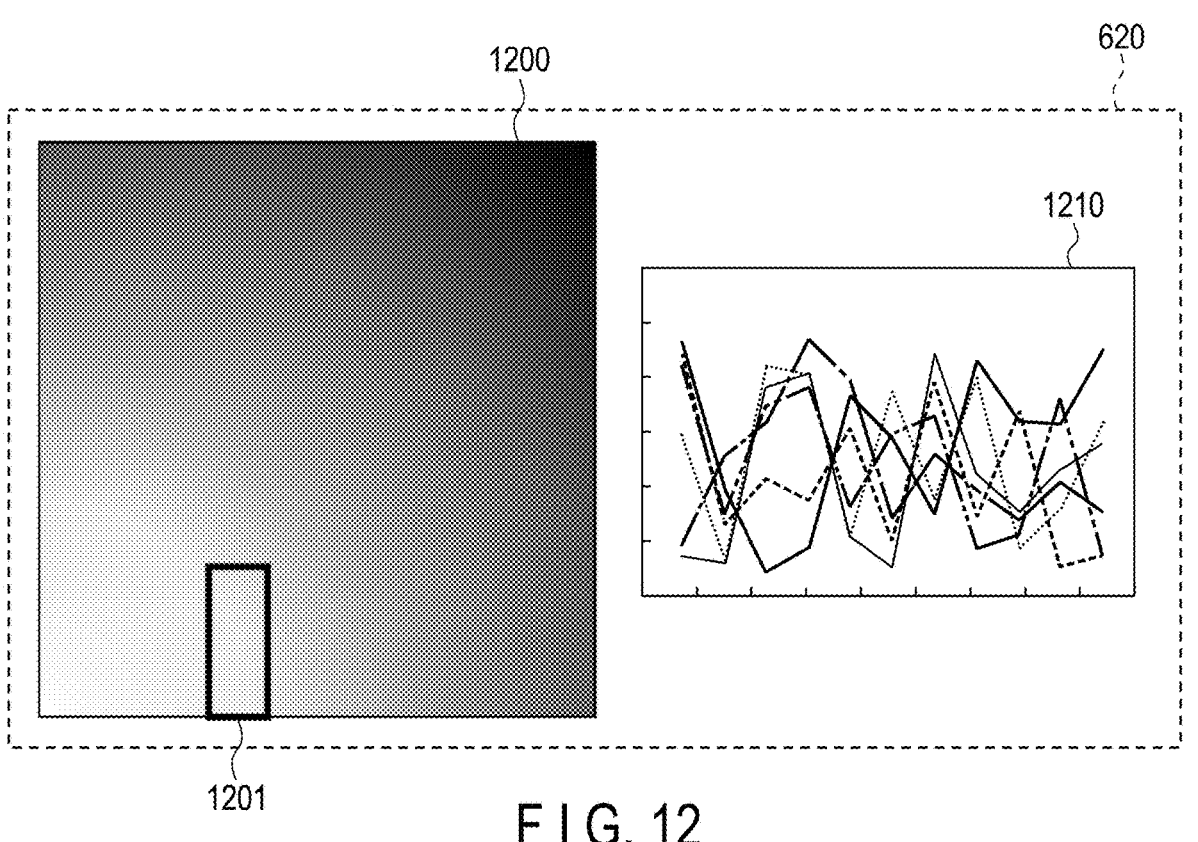
1201
F I G. 12
1300
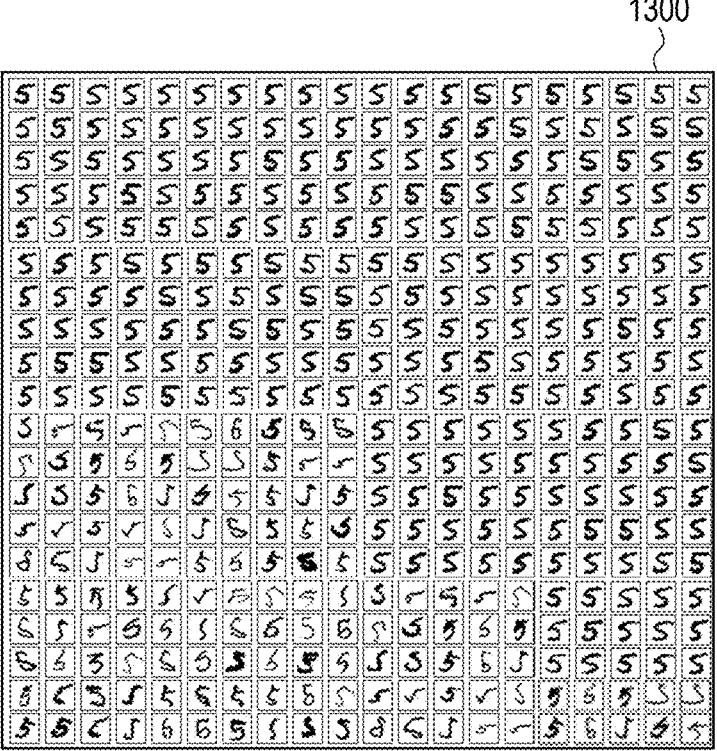
F I G. 13

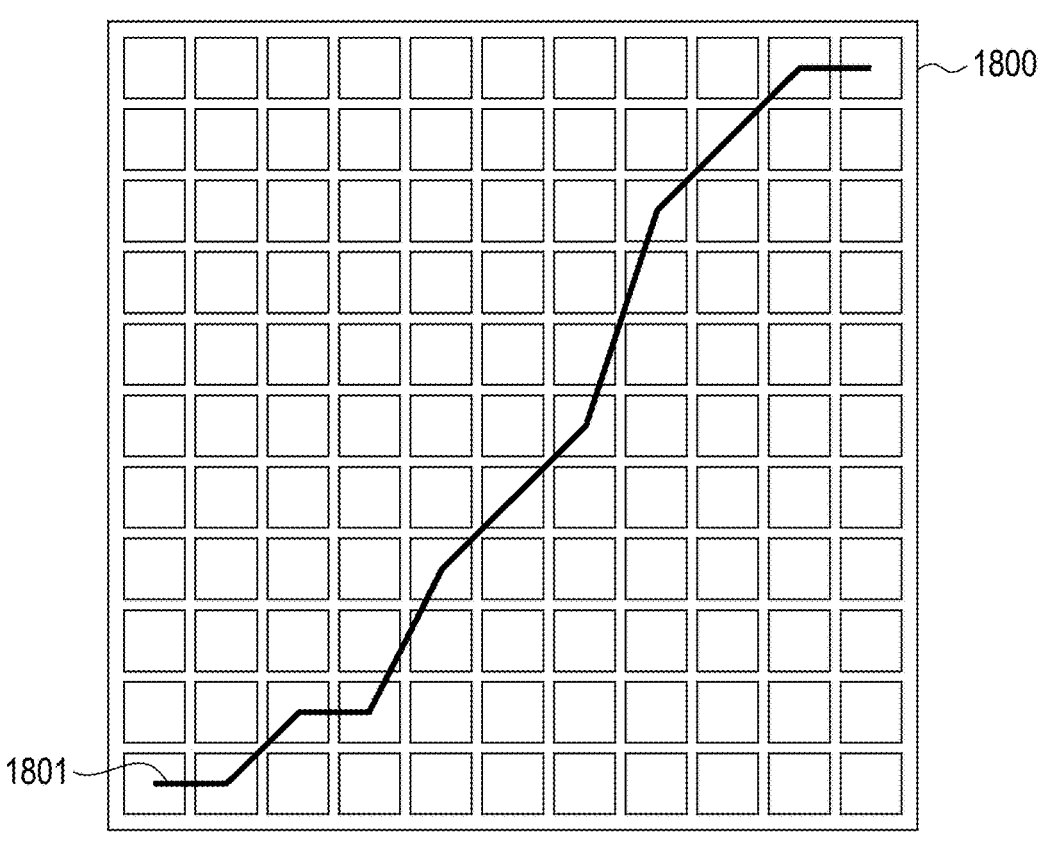
F I G. 18
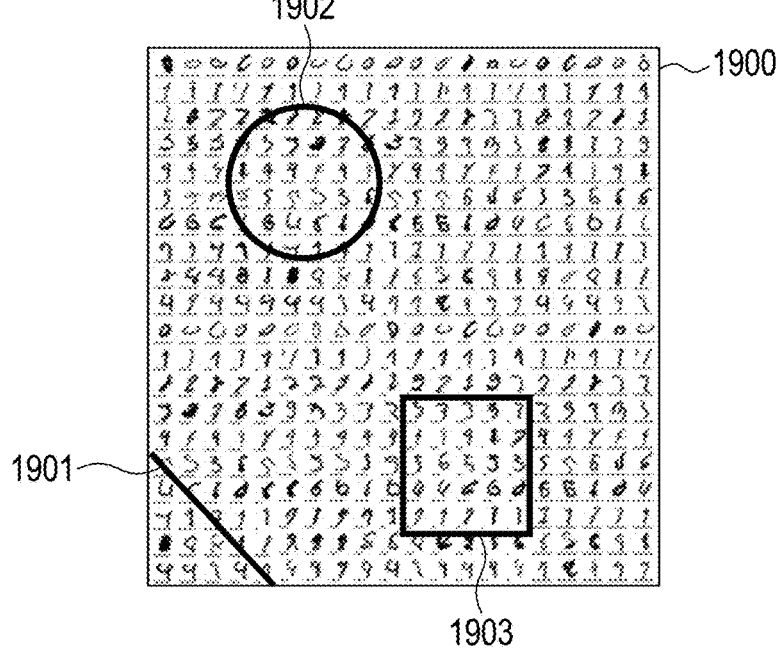
F I G. 19

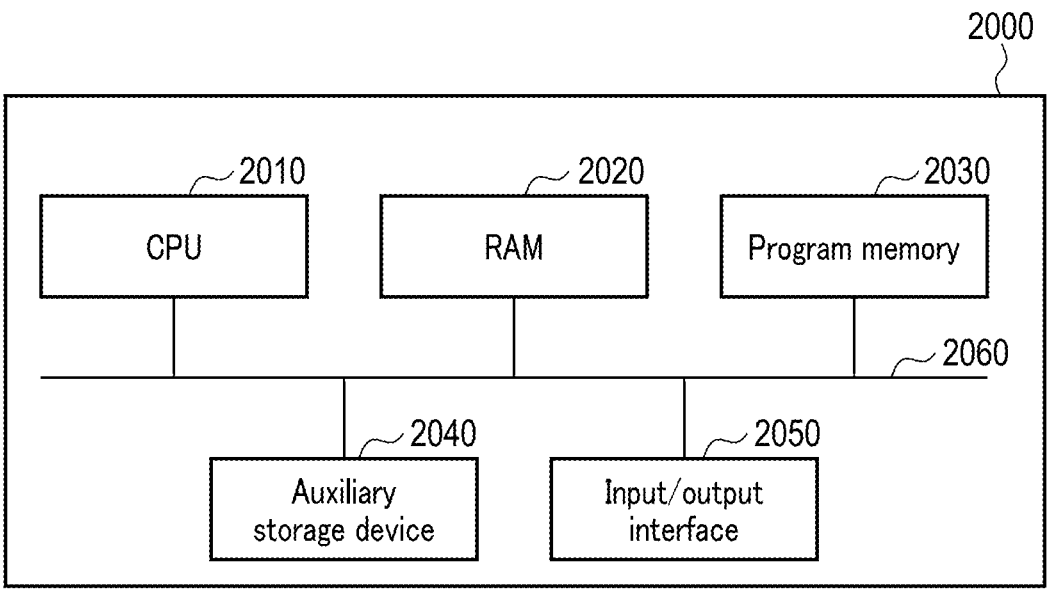
F I G. 20

DISPLAYING ITERATIVE LEARNING PROCESS AND SAMPLE ERROR TO EFFICIENTLY ELIMINATE NOISY SAMPLE DATA

CROSS-REFERENCE TO RELATED APPLICATIONS

This application is based upon and claims the benefit of priority from Japanese Patent Application No. 2020-151050, filed Sep. 9, 2020, the entire contents of which are incorporated herein by reference.

FIELD

Embodiments described herein relate generally to a learning apparatus, a learning method and a non-transitory computer-readable storage medium.

BACKGROUND

Conventionally, in a learning model of machine learning, it is known that when a learning sample used for learning contains noisy data, learning becomes unstable and estimation accuracy of the learning model decreases. The noisy data is, for example, data in which an erroneous label (teaching) is given in learning data, and data including an irregular learning sample that is difficult for humans to discriminate.

By the way, there is known a learning apparatus that simultaneously displays an error of the learning data and an error of verification data when the learning model is learned. Since this learning apparatus displays the above two errors during learning, there is a possibility that over-learning can be avoided and the number of repetitions (iterations) of learning can be reduced.

However, since the above-mentioned learning apparatus performs learning including the noisy data included in the learning sample, it may not be possible to avoid a decrease in the estimation accuracy of the learning model due to the noisy data. For example, if the noisy data can be efficiently found in the learning sample, it is considered that the decrease in the estimation accuracy can be avoided by performing learning after eliminating the noisy data; however, no such learning apparatus is known.

BRIEF DESCRIPTION OF THE DRAWINGS

FIG. 3 is a first example of a learning sample and a target label;

FIG. 4 is a second example of the learning sample and the target label;

FIG. 5 is a third example of the learning sample and the target label;

FIG. 6 is a diagram illustrating display data in the first embodiment;

FIG. 7 is a diagram explaining a layout image of the display data of FIG. 6;

FIG. 8 is a block diagram illustrating a configuration of a learning apparatus according to a second embodiment;

FIG. 10 is a diagram explaining a boundary line set in the layout image;

FIG. 11 is a diagram explaining exclusion of the learning sample by the set boundary line;

FIG. 12 is a diagram illustrating an error map image as the layout image;

FIG. 13 is a diagram illustrating a cluster display of the layout image;

FIG. 18 is a fifth example of the method of displaying the layout image;

FIG. 19 is a diagram explaining the boundary line that can be set in the layout image; and FIG. 20 is a block diagram illustrating a hardware configuration of a computer according to an embodiment.

DETAILED DESCRIPTION

In general, according to one embodiment, a learning apparatus includes processing circuitry. The processing circuitry acquires a plurality of learning samples to be learned and a plurality of target labels associated with the respective learning samples, iteratively learns a learning model so that a learning error between output data corresponding to the learning sample and the target label is small with respect to the learning model to which the output data is output by inputting the learning sample, and displays a layout image in which at least some of the learning samples are arranged based on a learning progress regarding the iterative learning of the learning model and a plurality of the learning errors.

Hereinafter, embodiments of a learning apparatus will be described in detail with reference to the drawings. In the following embodiments, a learning model of machine learning for executing a 10-class image classification task of classifying image data, obtained by imaging handwritten numbers, into any of numbers from 0 to 9 will be described as an example. For learning (or re-learning) of the learning model, a learning data set in which image data (learning sample) and data (target label) indicating numbers are associated with each other is used. As machine learning, for example, a neural network is used. That is, the learning model of the present embodiment is a neural network model.

First Embodiment

Figure 1:
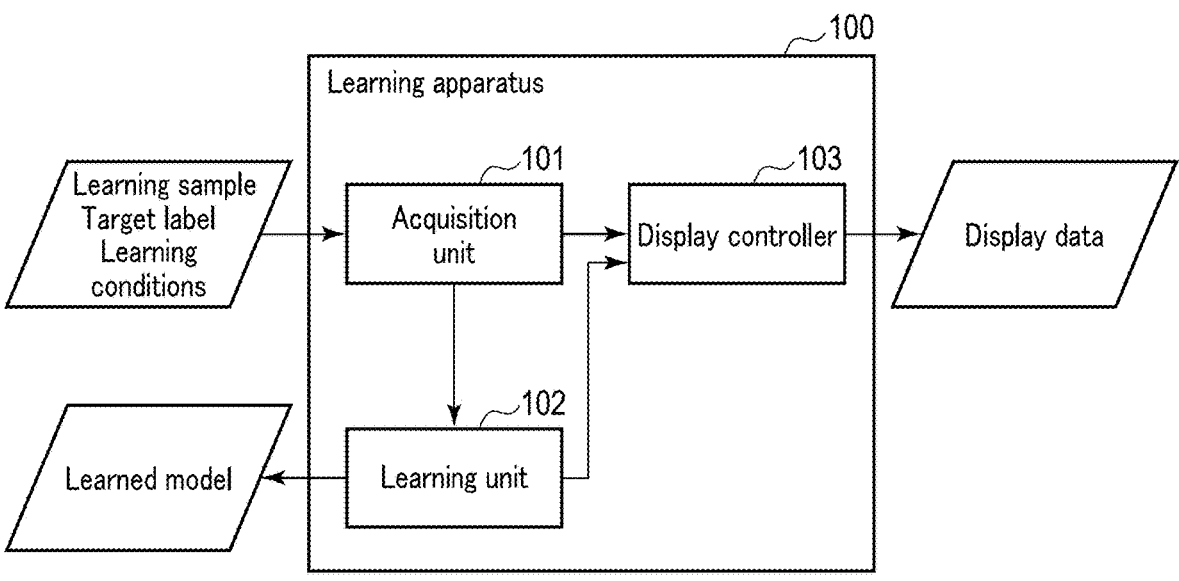
FIG. 1 is a block diagram illustrating a configuration of a learning apparatus according to a first embodiment.

FIG. 1 is a block diagram illustrating a configuration of a learning apparatus according to a first embodiment. A learning apparatus 100 of FIG. 1 is a computer for generating a learned model by learning a learning model of machine learning. The learning apparatus 100 includes an acquisition unit 101, a learning unit 102, and a display controller 103.

The acquisition unit 101 acquires a learning sample, a target label, and learning conditions. The acquisition unit 101 outputs the learning sample, the target label, and the learning conditions to the learning unit 102, and outputs at least the learning sample to the display controller 103.

The learning sample is associated with the target label. Thus, a combination of the learning sample and the target label may be referred to as a learning data set. In the following, for example, the learning sample will be represented by $x_i$ (i=1, 2, . . . , N), and the target label will be represented by $t_i$ (i=1, 2, . . . , N). Here, i indicates a serial number of the learning data set, and N indicates a total number of the learning data sets.

The learning conditions include, for example, a structural parameter and an optimization parameter. The structural parameter includes, for example, a type of architecture, the number of network layers, the number of nodes in each layer, a connection method between layers, and a type of activation function used in each layer. The optimization parameter includes, for example, a type of optimizer, a learning rate, the number of mini-batches (mini-batch size), the number of times of iterative learning (upper limit of the number of iterations), and a termination condition.

The learning unit 102 receives the learning sample, the target label, and the learning conditions from the acquisition unit 101. The learning unit 102 iteratively learns a neural network based on the learning sample, the target label, and the learning conditions. The learning unit 102 outputs information on a learning progress (learning progress information) and information on a learning error (learning error information) regarding iterative learning to the display controller 103, and outputs the learning model in which learning is completed as a learned model.

The learning progress information includes, for example, information on the number of times the learning sample is iteratively learned (the number of times of iterative learning). The learning error information includes, for example, information in which the learning sample used for learning and the learning error regarding the learning sample are associated with each other. The learning error regarding the learning sample represents an error between output data output by inputting the learning sample to the learning model and the target label associated with the learning sample.

For the iterative learning, for example, the following formulas (1) and (2) are used.

$$y_i = f(w, x_i) \tag{1}$$

$$L_i = -t_i^T \ln(y_i) \tag{2}$$

In the formula (1), $y_i$ represents the output data when the learning sample $x_i$ is input to the learning model, and f is a function of the neural network. Here, w indicates a parameter set. That is, the function f represents a network including an input layer, a convolutional layer, a fully connected layer, a normalized layer, a pooling layer, an output layer, and the like that satisfy the parameter set w. In the present embodiment, since a neural network that executes a 10-class image classification task is assumed, the output data $y_i$ is a 10-dimensional vector. It is assumed that the function f uses a softmax function in the activation function of the output layer, the vector of the output data $y_i$ is a non-negative element, and a sum of the elements is normalized to 1.

In the formula (2), $L_i$ represents the learning error of the output data $y_i$ corresponding to the learning sample $x_i$. The calculation in the formula (2) represents a cross entropy of the target label $t_i$ and the output data $y_i$.

In the present embodiment, the learning unit 102 uses, for example, a loss calculated by an average of the learning errors of a learning sample set selected by the mini-batch size, and iteratively learns the value of the parameter w of the neural network by an error back propagation method and a stochastic gradient descent method. In other words, the learning unit 102 repeatedly learns (iteratively learns) the learning model so that the learning error between the output data corresponding to the learning sample and the target label becomes small with respect to the learning model to which the output data is output by inputting the learning sample.

In addition, the learning unit 102 determines whether or not to terminate the iterative learning based on the number of times of iterative learning included in the learning conditions, the termination condition, and the like. For example, the learning unit 102 determines whether or not learning currently being performed satisfies a predetermined number of iterations. The learning unit 102 performs iterative learning until the predetermined number of iterations is satisfied, and when the number of iterations is satisfied, the learning unit 102 outputs the learned learning model as a learned model. The learning apparatus 100 may perform the above determination processing.

The display controller 103 receives at least the learning sample from the acquisition unit 101, and receives the learning progress information and the learning error information from the learning unit 102. The display controller 103 displays a layout image in which at least some learning samples among all the learning samples are arranged based on the learning progress information and the learning error information. The display controller 103 outputs display data including the layout image to a display or the like.

The learning apparatus 100 may include a memory and a processor. The memory stores, for example, various programs (for example, a learning monitoring program capable of monitoring a state of an output model that is still learned) regarding the operation of the learning apparatus 100. The processor realizes each function of the acquisition unit 101, the learning unit 102, and the display controller 103 by executing various programs stored in the memory.

Hereinabove, the configuration of the learning apparatus 100 according to the first embodiment has been described. Next, the operation of the learning apparatus 100 will be described with reference to the flowchart of FIG. 2.

Figure 2:
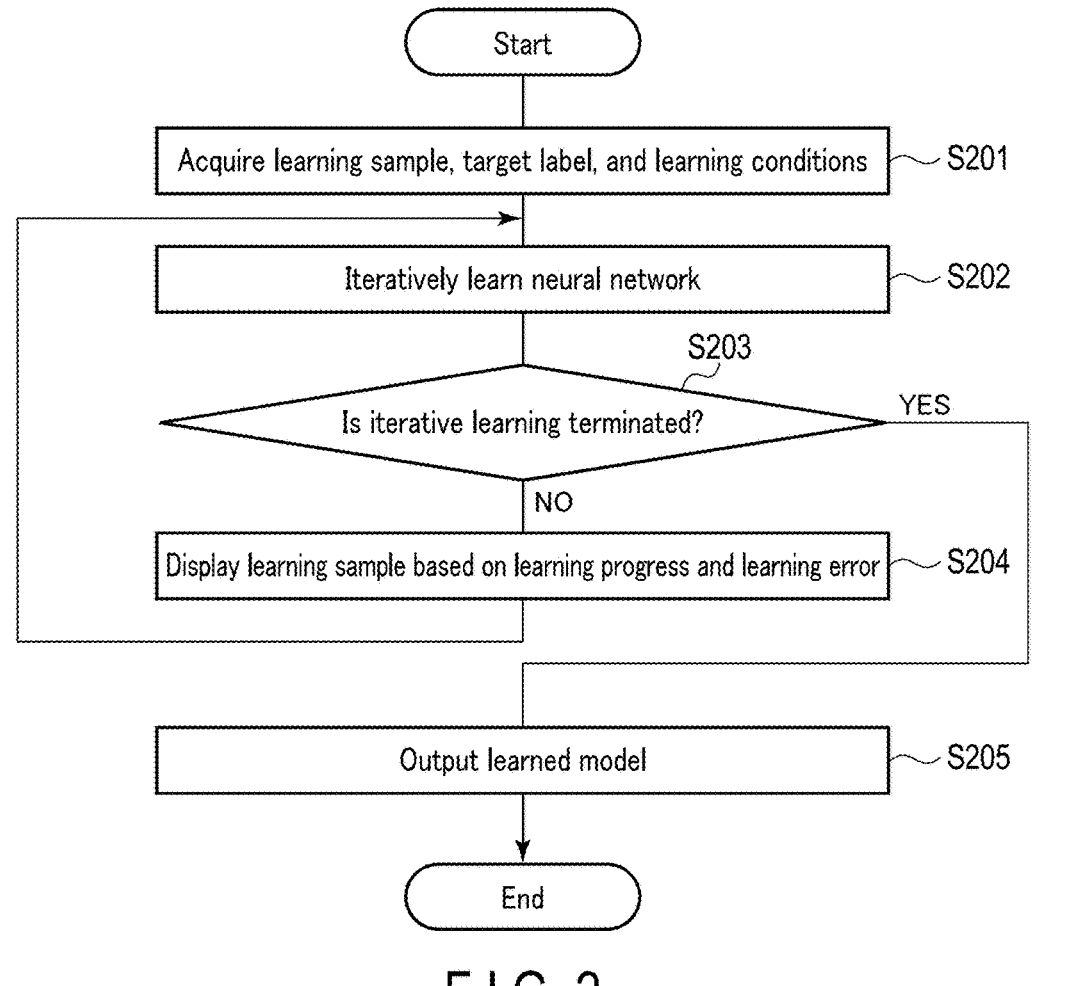
FIG. 2 is a flowchart illustrating an operation of the learning apparatus of FIG. 1.

FIG. 2 is a flowchart illustrating the operation of the learning apparatus of FIG. 1. The processing of the flowchart of FIG. 2 starts when the learning monitoring program is executed by a user.

(Step S201)

When the learning monitoring program is executed, the acquisition unit 101 acquires the learning sample, the target label, and the learning conditions. In the following specific examples, the learning sample is image data represented by a set of pixels having a horizontal width (longitudinal width) W and a vertical width (lateral width) H. That is, the learning sample $x_i$ is a W×H dimensional vector. The target label is represented by a 10-dimensional vector in which an element that specifies the learning sample is "1" and the other elements are "0" (zero). Hereinafter, the combination of the learning sample and the target label will be described with reference to FIGS. 3 to 5.

FIG. 3 is a first example of the learning sample and the target label. In the learning sample $x_1$ of FIG. 3, a pixel value at a pixel position (u, v) of image data 300 is represented by $p_1$ (u, v). Here, u indicates a pixel position in a horizontal direction, and is any of 1 to W. v indicates the pixel position in a vertical direction and is any of 1 to H.

Target label $t_1$ is associated with the learning sample $x_1$ of FIG. 3. The target label $t_1$ is indicated by a vector (0,0,0,0, 0,1,0,0,0,0)$^T$ in which an element that specifies the image data 300 is "1" and the other elements are "0" (zero). Here, a position of each element of the vector of the target label corresponds to a number written in the image data. Thus, in the target label $t_1$, "1" is set at the position of the element corresponding to the number "5" written in the image data 300. As described above, the learning data set in which the learning sample and the target label are correctly associated with each other is referred to as normal data.

FIG. 4 is a second example of the learning sample and the target label. In a learning sample $x_2$ of FIG. 4, a pixel value of image data 400 is represented by $p_2$ (u, v) as in FIG. 3. Target label $t_2=(0,0,1,0,0,0,0,0,0,0)^T$ is associated with the learning sample $x_2$ of FIG. 4. Here, although the number "5" is written in the image data 400 of FIG. 4, "1" is set at the position of the element corresponding to the number "2" in the target label $t_2$. As described above, the learning data set in which the learning sample and the target label are not correctly associated with each other is referred to as noisy data.

FIG. 5 is a third example of the learning sample and the target label. In a learning sample $x_3$ of FIG. 5, a pixel value of image data 500 is represented by $p_3$ (u, v) as in FIG. 3. Target label $t_3=(0,0,0,0,0,1,0,0,0,0)^T$ is associated with the learning sample $x_3$ of FIG. 5. Here, in the image data 500 of FIG. 5, a number that is difficult for a person to distinguish is written. That is, the image data 500 is an irregular sample. In the target label $t_3$, "1" is set at the position of the element corresponding to the number "5". As described above, the learning data set including the irregular learning sample is also referred to as the noisy data.

It is assumed that the learning data set acquired by the acquisition unit 101 includes the noisy data as described above. When such noisy data is used for learning a learning model, this causes a decrease in estimation accuracy of the learning model.

(Step S202)

After the learning sample, the target label, and the learning conditions are acquired, the learning unit 102 iteratively learns the neural network based on the learning sample, the target label, and the learning conditions. Specifically, the learning unit 102 inputs the learning sample and thereby iteratively learns so that the learning error between the output data corresponding to the input learning sample and the target label becomes small with respect to a neural network model to which the output data is output. For example, the learning unit 102 performs learning by changing the parameter of the neural network by using the error back propagation method and the stochastic gradient descent method.

To be precise, the processing returns from step S204 to step S202, which will be described later, and the processing of step S202 is repeated to perform "iterative learning". However, for convenience of explanation, it is assumed that this is known, and the description that the iterative learning is performed in step S202 will be followed.

(Step S203)

When learning for all the learning samples is performed one cycle, the learning unit 102 determines whether or not to terminate the iterative learning. For this determination, for example, the upper limit of the number of iterations included in the learning conditions is used. When it is determined that the iterative learning is not terminated, the processing proceeds to step S204. When it is determined that the iterative learning is terminated, the processing proceeds to step S205.

(Step S204)

After it is determined that the iterative learning is not terminated, the display controller 103 displays the learning sample based on the learning progress and the learning error. Specifically, the display controller 103 disposes the learning sample laid out according to the learning error in a column direction, and displays an output learning sample image in which the learning progress is associated in a row direction. The output learning sample image may be referred to as, for example, a layout image. After step S204, the processing returns to step S202. In the following, the display data including the layout image and the layout image will be described with reference to FIGS. 6 and 7.

FIG. 6 is a diagram illustrating the display data in the first embodiment. Display data 600 of FIG. 6 has, for example, a display region 610 of an error graph at an upper portion of a display screen and a display region 620 of the output learning sample image at a lower portion of the display screen. The display data 600 of FIG. 6 shows a state at the time when the 20th iterative learning is terminated.

In the display region 610, a graph 611 for learning data and a graph 612 for verification data are displayed, with the horizontal axis representing the learning progress and the vertical axis representing a correct ratio. A layout image 621 is displayed in the display region 620.

FIG. 7 is a diagram explaining the layout image of the display data of FIG. 6. In the layout image 621, the learning sample laid out according to the learning error is disposed in the column direction, and the learning progress is associated in the row direction. In the layout image 621 of FIG. 7, a total number of the learning samples to be displayed in one column is 20, and since there are 20 rows, a total of 400 learning samples are included.

Specifically, in the layout image 621, the learning samples corresponding to the learning error calculated by the first iterative learning are arranged in ascending order from top to bottom in a leftmost column region 700. Further, in the layout image 621, in the row direction, the learning sample is similarly disposed for each learning progress, that is, each time the iterative learning is performed. Further, in the layout image 621, the learning samples corresponding to the learning error calculated by the 20th iterative learning are arranged in ascending order from top to bottom in a rightmost column region 701. The individual learning samples displayed in the layout image 621 are merely examples, and are different from the results actually displayed. For example, in the layout image, the learning samples may or may not be arranged so as to display all the target label as shown in FIG. 7. Furthermore, in the layout image 621, a thumbnail of the learning sample may be disposed.

In the layout image 621 in which the above arrangement is formed, for example, noisy data is concentrated on the learning sample disposed in a region where the learning progress is small and the learning error is large. Specifically, the noisy data is concentrated in a lower left region of the layout image 621. Thus, the user can efficiently find the noisy data by checking (visually confirming) the layout image 621.

The learning samples displayed in a row may be all the learning samples used for learning, or may be some learning samples corresponding to representative values of the learning errors. The representative value of the learning error is, for example, an average of the learning errors in each group in which all the learning samples arranged in an order of the learning error are grouped according to the number of learning samples desired to be displayed in a row. In this case, the learning sample to be displayed is the learning sample corresponding to the learning error closest to the average of the learning errors. In the following description, the learning samples displayed in a row are all the learning samples used for learning.

A method of arranging the learning samples is not limited to the above method. For example, in the layout image, the learning samples corresponding to the learning error may be arranged in the column direction in descending order. Furthermore, in the layout image, the learning sample corresponding to the learning error may be disposed in the row direction, and the learning progress may be associated in the column direction.

(Step S205)

After it is determined that the iterative learning is terminated, the learning unit 102 outputs the learned learning model as the learned model. In step S205, the processing of step S204 may be performed together. That is, in step S205, the display controller 103 may display the output learning sample image at the time when the iterative learning is terminated. After the processing of step S205, the learning monitoring program ends.

As described above, the learning apparatus according to the first embodiment acquires the plurality of learning samples to be learned and the plurality of target labels associated with the respective learning samples, iteratively learns a learning model so that the learning error between the output data corresponding to the learning sample and the target label is small with respect to the learning model to which the output data is output by inputting the learning sample, and displays the layout image in which at least some of the plurality of learning samples are arranged based on a learning progress regarding the iterative learning of the learning model and the plurality of learning errors.

Therefore, the learning apparatus according to the first embodiment can efficiently find the noisy data from the learning sample by disposing the learning sample based on the learning error.

Second Embodiment

In the first embodiment, it has been described that the learning sample is disposed based on the learning error. On the other hand, in the second embodiment, a method of efficiently eliminating noisy data from the learning sample will be described.

FIG. 8 is a block diagram illustrating a configuration of a learning apparatus according to the second embodiment. A learning apparatus 800 of FIG. 8 is a computer for generating a learned model by learning a learning model of machine learning. The learning apparatus 800 includes an acquisition unit 801, a learning unit 802, a display controller 803, and a setting unit 804.

The acquisition unit 801 acquires the learning sample, target label, and learning conditions. The acquisition unit 801 outputs the learning sample, the target label, and the learning conditions to the learning unit 802, and outputs at least the learning sample to the display controller 803.

The learning unit 802 receives the learning sample, the target label, and the learning conditions from the acquisition unit 801. The learning unit 802 iteratively learns a neural network based on the learning sample, the target label, and the learning conditions. The learning unit 802 outputs learning progress information and learning error information to the display controller 803, and outputs the learning model in which learning is completed as a learned model.

The display controller 803 receives at least the learning sample from the acquisition unit 801, and receives the learning progress information and the learning error information from the learning unit 802. The display controller 803 displays a layout image in which at least some learning samples among all the learning samples are arranged based on the learning progress information and the learning error information. The display controller 803 outputs display data including the layout image to a display or the like.

The setting unit 804 sets a boundary line on the layout image included in the display data by input from an input unit (not shown in the drawing). Specifically, the setting unit 804 generates, for example, boundary line information including information on a position of the boundary line on the layout image when the boundary line is set on the layout image by an instruction from a user via the input unit. The setting unit 804 outputs the boundary line information to the display controller 803. The setting unit 804 may determine whether or not the boundary line has been set (input).

In addition, the display controller 803 receives the boundary line information from the setting unit 804. The display controller 803 generates exclusion information including information of the learning sample (learning data set) to be excluded from learning based on the boundary line information. The display controller 803 outputs the exclusion information to the learning unit 802.

In addition, the learning unit 802 receives the exclusion information from the display controller 803. The learning unit 802 excludes one or more learning samples designated by the set boundary line from all the learning samples based on the exclusion information. Then, the learning unit 802 iteratively learns the neural network using the learning samples from which some are excluded. For example, the learning unit 802 iteratively learns the neural network using the learning samples from which some are excluded during learning at the time when the boundary line is set or in the next learning at the time when the boundary line is set. Alternatively, the learning unit 802 may determine an arbitrary time point in the learning progress based on the set boundary line, and may restart from an arbitrary time point at which learning using the learning samples from which some are excluded is determined.

The learning apparatus 800 may include a memory and a processor. The memory stores, for example, various programs (for example, a learning monitoring program capable of monitoring a state of an output model that is still learned) regarding the operation of the learning apparatus 800. The processor realizes each function of the acquisition unit 801, the learning unit 802, the display controller 803, and the setting unit 804 by executing various programs stored in the memory.

Hereinabove, the configuration of the learning apparatus 800 according to the second embodiment has been described. Next, the operation of the learning apparatus 800 will be described with reference to the flowchart of FIG. 9.

Figure 9:
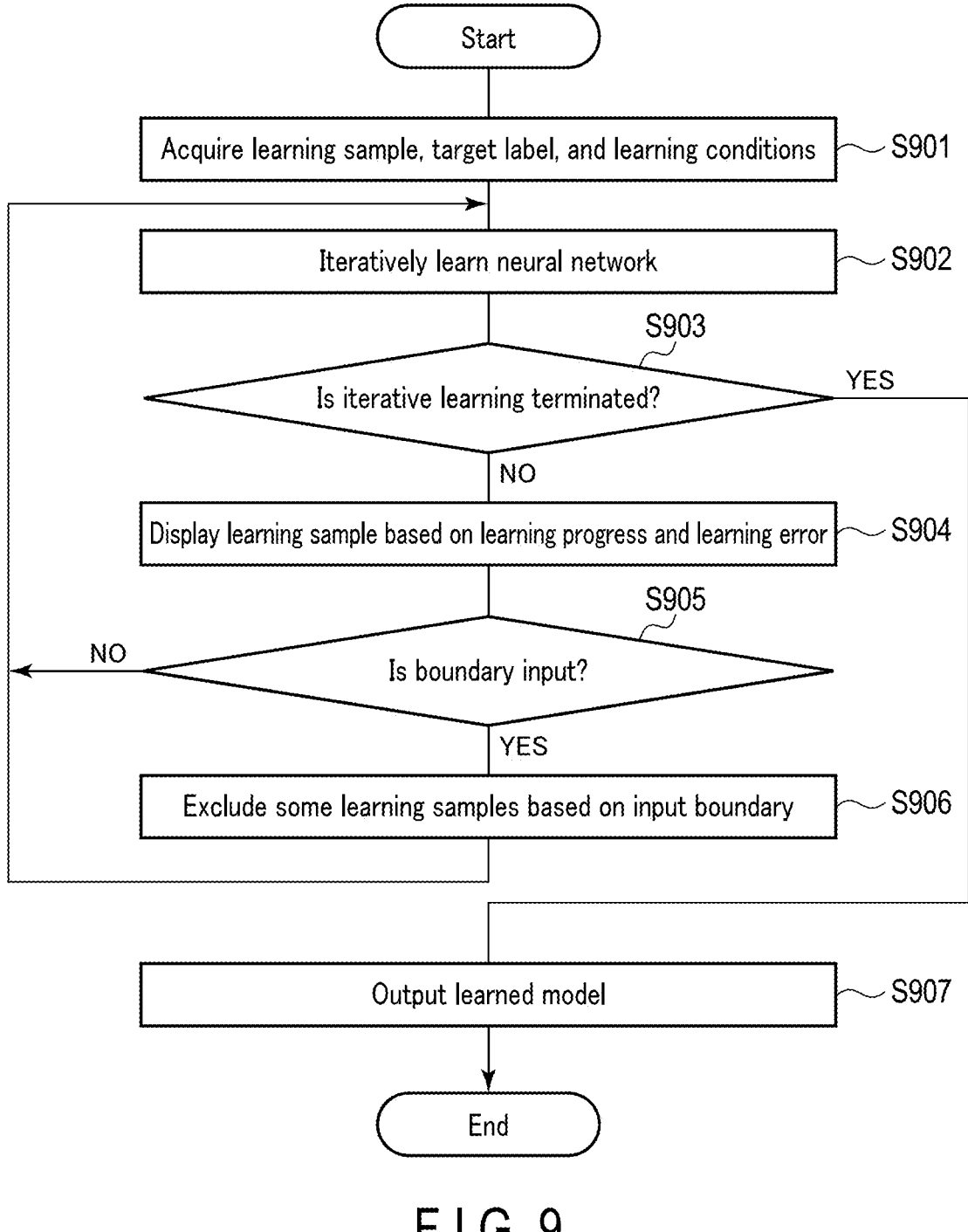
FIG. 9 is a flowchart illustrating an operation of the learning apparatus of FIG. 8.

FIG. 9 is a flowchart illustrating the operation of the learning apparatus of FIG. 8. The processing of the flowchart of FIG. 9 starts when the learning monitoring program is executed by a user.

(Step S901)

When the learning monitoring program is executed, the acquisition unit 801 acquires the learning sample, the target label, and the learning conditions.

(Step S902)

After the learning sample, the target label, and the learning conditions are acquired, the learning unit 802 iteratively learns the neural network based on the learning sample, the target label, and the learning conditions. Specifically, the learning unit 802 iteratively learns a neural network model so that the learning error between the output data corresponding to the learning sample and the target label becomes small with respect to the neural network model to which the output data is output by inputting the learning sample.

To be precise, the processing returns to step S905 or from step S906 to step S902, which will be described later, and the processing of step S902 is repeated to perform "iterative learning". However, for convenience of explanation, it is assumed that this is known, and the description that the iterative learning is performed in step S902 will be followed.

(Step S903)

When learning for all the learning samples is performed one cycle, the learning unit 802 determines whether or not to terminate the iterative learning. When it is determined that the iterative learning is not terminated, the processing proceeds to step S904. When it is determined that the iterative learning is terminated, the processing proceeds to step S907.

(Step S904)

After it is determined that the iterative learning is not terminated, the display controller 803 displays the learning sample based on the learning progress and the learning error. Specifically, the display controller 803 disposes the learning sample laid out according to the learning error in a column direction, and displays the layout image in which the learning progress is associated in a row direction.

(Step S905)

After the layout image is displayed, the setting unit 804 determines whether or not the boundary line has been input. When it is determined that the boundary line is not input, the processing returns to step S902. When it is determined that the boundary line has been input, the setting unit 804 generates the boundary line information, and the display controller 803 generates the exclusion information based on the boundary line information. Then, the processing proceeds to step S906. In the following, the boundary line set in the layout image will be described with reference to FIG. 10.

FIG. 10 is a diagram explaining the boundary line set in the layout image. Display data 600 of FIG. 10 includes a graph 611, a graph 612, and a layout image 621. The layout image 621 of FIG. 10 shows a state in which a boundary line 1000 is set.

For example, the boundary line 1000 is set to divide a plurality of learning samples arranged in the column direction for each learning progress. Specifically, the user confirms the layout image 621 on the display data 600, and sets a boundary line with a number that is difficult to distinguish, such as the learning sample of FIG. 5, as a boundary. Then, the display controller 803 includes, as the learning sample to be excluded from learning, the learning sample in a region below the boundary line 1000 in the layout image 621, that is, a region in a direction in which the learning error becomes large, in the exclusion information. At this time, since the learning sample used for each learning progress is common, the display controller 803 may combine the information of the overlapping learning sample included in the exclusion information into one information.

(Step S906)

After it is determined that the boundary line has been input, the learning unit 802 excludes some learning samples based on the input boundary line. Specifically, the learning unit 802 excludes one or more learning samples designated by the set boundary line from all the learning samples, based on the exclusion information. After step S906, the processing returns to step S902. In the following, the learning samples to be excluded will be described with reference to FIG. 11.

FIG. 11 is a diagram explaining exclusion of the learning sample by the set boundary line. FIG. 11 shows a total amount 1100 of the learning samples before exclusion and a total amount 1101 of the learning samples after exclusion.

For example, when the boundary line 1000 is set in the layout image 621 of FIG. 10, the learning sample below the boundary line 1000, that is, the learning sample in a direction in which the learning error becomes large is excluded, so that the total amount of the learning samples used in the learning unit 802 is reduced. In the example of FIG. 10, the learning unit 802 performs learning using all the learning samples (total amount 1100) until the 20th iterative learning, and performs learning using the learning samples (total amount 1101) from which some are excluded from the 21st iterative learning.

Thus, in step S902, which is a transition from step S906, the learning unit 802 iteratively learns the neural network using the learning samples from which some are excluded in step S906. Since it is expected that the excluded learning sample will contain a large amount of noisy data, it is expected that accuracy of learning after the boundary line is set will be improved.

(Step S907)

After it is determined that the iterative learning is terminated, the learning unit 802 outputs the learned learning model as the learned model. In step S907, the processing of step S904 may be performed together. That is, in step S907, the display controller 803 may display the layout image at the time when the iterative learning is terminated. After step S907, the learning monitoring program ends.

As described above, the learning apparatus according to the second embodiment acquires the plurality of learning samples to be learned and the plurality of target labels associated with the respective learning samples and inputs the learning sample to iteratively learn the learning model so that the learning error between the output data corresponding to the learning sample and the target label is small with respect to the learning model to which the output data is output, and displays the layout image in which at least some of the plurality of learning samples are arranged based on the learning progress regarding the iterative learning of the learning model and the plurality of learning errors. Then, the learning apparatus according to the second embodiment sets the boundary line on the layout image, and excludes one or more learning samples designated by the set boundary line from the plurality of learning samples to learn the learning model.

Therefore, since the learning apparatus according to the second embodiment can efficiently exclude the noisy data from the learning sample, it is possible to avoid a decrease in the estimation accuracy of the learning model due to the noisy data, learning is stabilized, and the estimation accuracy of the learning model is improved. The learning apparatus according to the second embodiment can be expected to have the same effect as the learning apparatus according to the first embodiment.

(Modification 1)

The learning apparatus according to each of the above embodiments uses the image data as the learning sample, but the present invention is not limited to this. For example, the learning apparatus may use, as the learning sample, primary data that is not image data, such as text string data, acceleration sensor data, angular velocity sensor data, audio signal data, ultrasonic echo signal data, and volume data of a magnetic resonance imaging apparatus, or multidimensional data. As described above, it is difficult to arrange and display the learning samples in these data, and even if these data are displayed, the user may not be able to discriminate them. Thus, when these data are handled, the learning apparatus may display an error map image as the layout image. In the error map image, for example, the learning errors are associated in the column direction in ascending or descending order, and the learning progress is associated in the row direction. In the following, the display of the error map image and the like will be described with reference to FIG. 12.

FIG. 12 is a diagram illustrating the error map image as the layout image. In FIG. 12, an error map image 1200 is displayed in the display region 620. In the error map image 1200, for example, pixels corresponding to the learning error are arranged in ascending order from top to bottom in the column direction, and a numerical value of the learning error and a pixel value indicating shading are displayed in correspondence with each other. Furthermore, in the error map image 1200, in the row direction, each pixel is similarly displayed in tone for each learning progress, that is, each time the iterative learning is performed. For example, each pixel of the error map image 1200 is set darker as the learning error is smaller and set lighter as the learning error is larger. As a result, the user can infer that the noisy data is collected in a light-colored region by checking (visually confirming) the error map image 1200. A color map in which an error value and a color are associated with each other may be used instead of the shading of the pixel value.

Furthermore, in FIG. 12, detailed data 1210 is displayed next to the error map image 1200. This detailed data 1210 corresponds to the learning sample in a range 1201 set by the user on the error map image 1200. As described above, the user's visibility is improved by separately displaying the learning sample in a selected range on the error map image without displaying all the learning samples as they are. The above is valid even when the layout image is displayed. For example, when a range is selected on the layout image, the detailed data is, for example, an enlarged image of the image data as the learning sample.

(Modification 2)

In the learning apparatus according to each of the above embodiments, all the learning samples are to be displayed as the layout images, but the present invention is not limited to this. For example, in the learning apparatus, the learning sample corresponding to specific target label may be a display target. The specific target label is, for example, data in which numerical values included in each element of a vector are the same. Specifically, the target label $t_1$ of FIG. 3 and the target label $t_3$ of FIG. 5 belong to a category of the specific target label. In the following, a cluster display of the learning sample corresponding to the specific target label will be described with reference to FIG. 13.

FIG. 13 is a diagram illustrating the cluster display of the layout image. A layout image 1300 of FIG. 13 displays, for example, only the learning sample associated with the target label indicating the number "5" written in the image data. When the learning sample corresponding to the specific target label is to be displayed in this way, the user can easily find an irregular sample such as the image data 500 of FIG. 5. In the cluster display, the output data may be used instead of the target label.

(Modification 3)

In the learning apparatus according to each of the above embodiments, only the learning sample is disposed and displayed on the layout image, but the present invention is not limited to this. For example, the learning apparatus may make various decorations on the layout image. In the following, a display method such as decoration for the layout image will be described with reference to FIGS. 14 to 16. In the layout images shown in FIGS. 14 to 16, a specific display of the learning sample is omitted.

Figure 14:
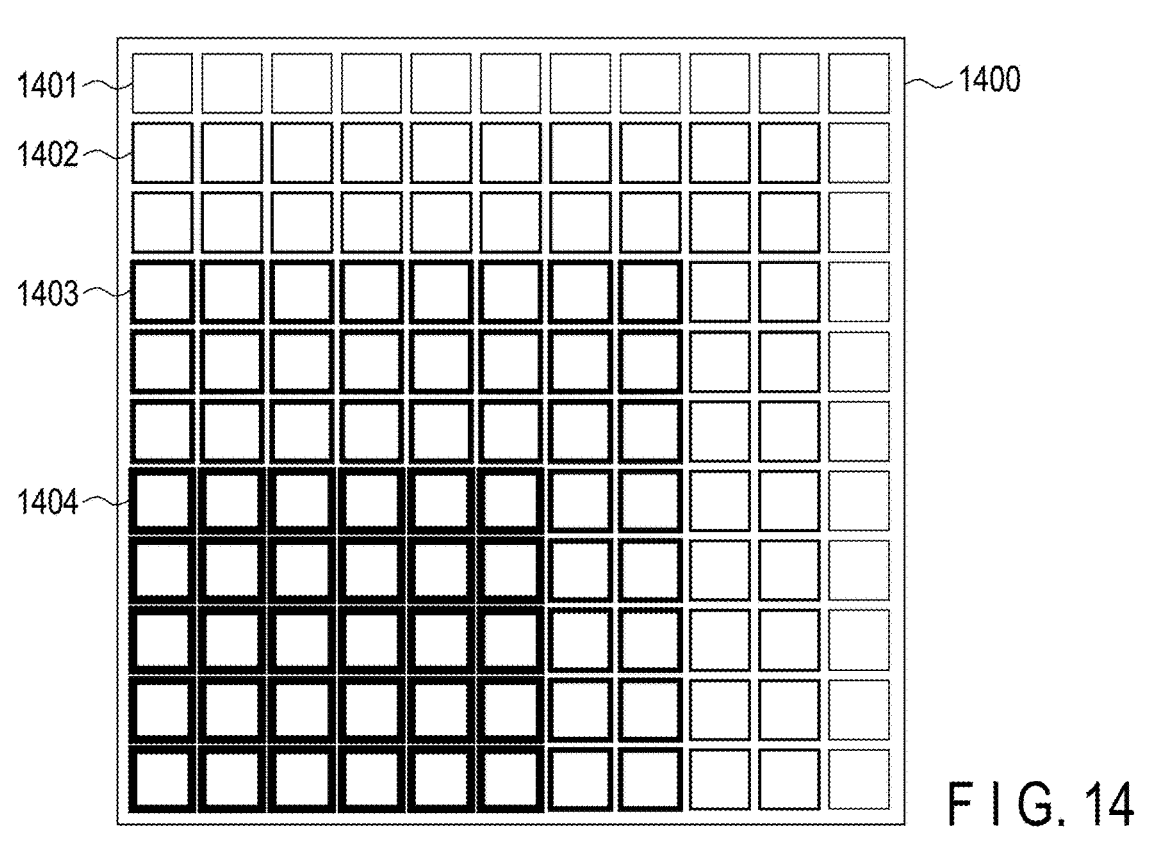
FIG. 14 is a first example of a method of displaying the layout image.

FIG. 14 is a first example of a method of displaying the layout image. In a layout image 1400 of FIG. 14, a thickness of a frame line of each learning sample is changed according to the value of the learning error. For example, in the layout image 1400, each learning sample is decorated with four types of frame lines. Specifically, in the layout image 1400, the frame lines are thickened in the order of a learning sample 1401, a learning sample 1402, a learning sample 1403, and a learning sample 1404. As a result, in the example of FIG. 14, it can be seen that the thicker the frame line of the learning sample, the larger the value of the learning error. A relationship between the value of the learning error and the thickness of the frame line of the learning sample may be arbitrarily determined.

Figure 15:
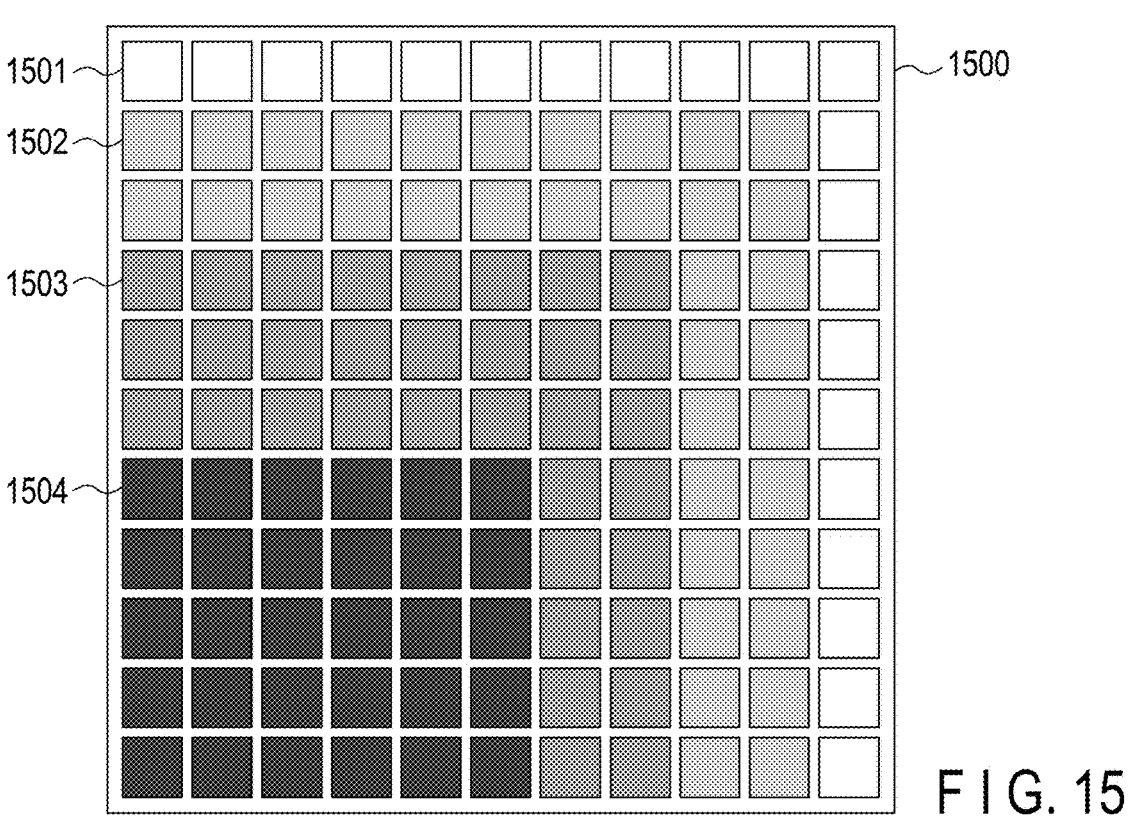
FIG. 15 is a second example of the method of displaying the layout image.

FIG. 15 is a second example of the method of displaying the layout image. In a layout image 1500 of FIG. 15, a color map is superimposed on each learning sample according to the value of the learning error. For example, in the layout image 1500, each learning sample is decorated with four types of colors. Specifically, in the layout image 1500, a color density is increased in the order of a learning sample 1501, a learning sample 1502, a learning sample 1503, and a learning sample 1504. As a result, in the example of FIG. 15, it can be seen that the darker the color superimposed on the learning sample, the larger the value of the learning error. A relationship between the value of the learning error and the color or density superimposed on the learning sample may be arbitrarily determined.

Figures 16, 17:
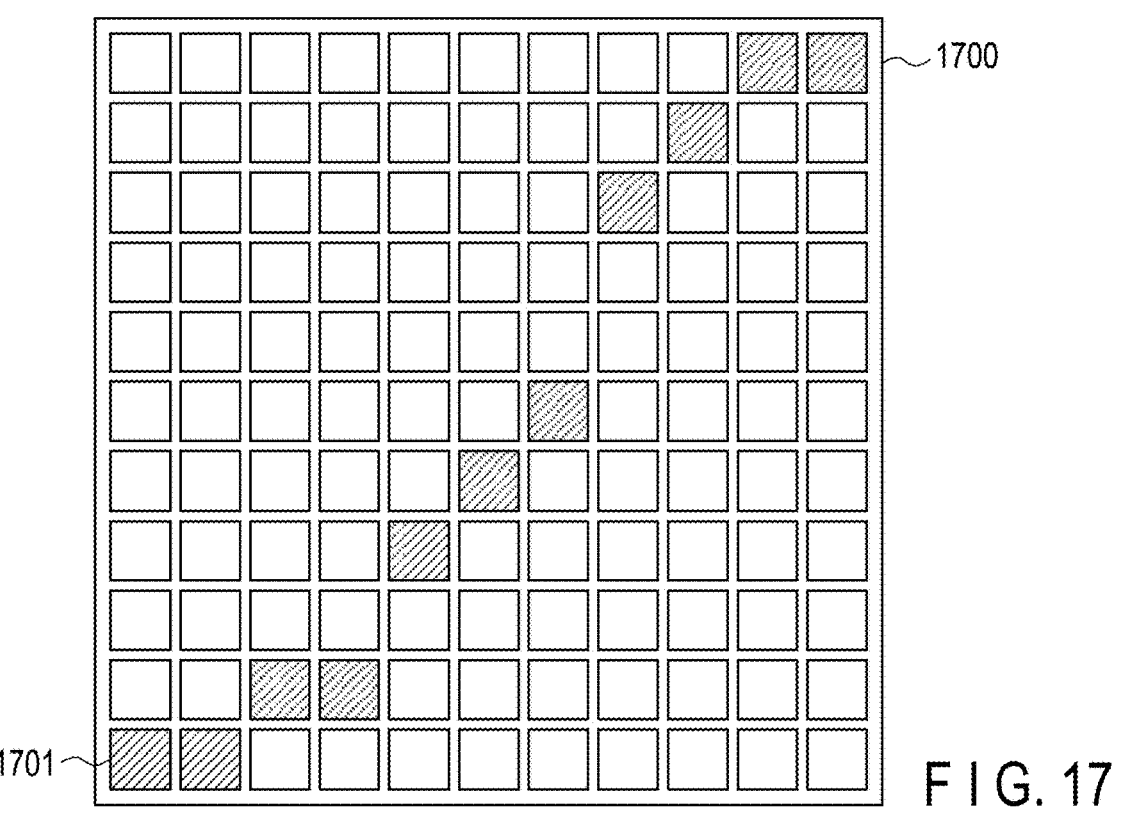
FIG. 16 is a third example of the method of displaying the layout image.
FIG. 17 is a fourth example of the method of displaying the layout image.

FIG. 16 is a third example of the method of displaying the layout image. In a layout image 1600 of FIG. 16, a thumbnail size of each learning sample is changed according to the value of the learning error. For example, the layout image 1600 uses four sizes. Specifically, in the layout image 1600, the thumbnail size is increased in the order of a learning sample 1601, a learning sample 1602, a learning sample 1603, and a learning sample 1604. In other words, in the layout image 1600, the thumbnail size is reduced in the order of the learning sample 1604, the learning sample 1603, the learning sample 1602, and the learning sample 1601. As a result, in the example of FIG. 16, it can be seen that the larger the thumbnail size of the learning sample, the larger the value of the learning error. A relationship between the value of the learning error and the thumbnail size of the learning sample may be arbitrarily determined.

(Modification 4)

In the learning apparatus according to each of the above embodiments, only the learning sample is disposed and displayed on the layout image, but the present invention is not limited to this. For example, the learning apparatus may highlight the same learning sample included for each learning progress. In this case, it is desirable that all the learning samples are displayed in the column direction in each learning progress in the layout image. In the following, highlighting of the same learning sample will be described with reference to FIGS. 17 and 18. In the layout images shown in FIGS. 17 and 18, a specific display of the learning sample is omitted.

FIGS. 17 and 18 are a fourth example and a fifth example of the method of displaying the layout image. In a layout image 1700 of FIG. 17, emphasis processing such as hatching is performed on the same learning sample 1701. A layout image 1800 of FIG. 18 shows a polygonal line 1801 passing over the same learning sample. By highlighting the same learning sample as described above, it is possible to get a bird's-eye view from a result of an initial learning progress to a result of the latest learning progress, so that transition of learning can be estimated. For example, if the learning error is large in the initial learning progress due to the emphasis processing as described above, there is a possibility that the target label is incorrect, and if the learning error increases as the learning progress progresses, it becomes easy to estimate that there is a possibility of over learning and the like. When the same learning sample is emphasized by a polygonal line, all the samples can be efficiently assigned in the column direction by using the error map image instead of the layout image.

(Modification 5)

In the learning apparatus according to the second embodiment described above, the straight boundary line is set in the row direction and the column direction on the layout image, but the present invention is not limited to this. For example, the learning apparatus may set straight lines, curved lines, and plane figures in any direction as the boundary lines on the layout image. In the following, the boundary lines which are straight lines and plane figures in any direction will be described with reference to FIG. 19.

FIG. 19 is a diagram explaining the boundary line that can be set in the layout image. Ina layout image 1900 of FIG. 19, setting of a plurality of boundary lines is illustrated. Specifically, in the layout image 1900, a diagonal straight line 1901, a circle 1902 as a plane figure, and a square 1903 as a plane figure are set as boundary lines. For example, the boundary line such as the circle 1902 or the square 1903 has a closed region and means selecting the learning sample contained within the closed region.

(Modification 6)

Although the learning apparatus according to each of the above embodiments deals with the learning model for the image classification task, the present invention is not limited to this. For example, the learning apparatus may perform a task of performing image segmentation, a regression task, and the like.

(Modification 7)

In the learning apparatus according to each of the above embodiments, the neural network model is used as the learning model, but the present invention is not limited to this. For example, in the learning apparatus, at least the learning model that performs iterative learning may be used.

FIG. 20 is a block diagram illustrating a hardware configuration of a computer according to an embodiment. A computer 2000 includes a central processing unit (CPU) 2010, a random access memory (RAM) 2020, a program memory 2030, an auxiliary storage device 2040, and an input/output interface 2050 as hardware. The CPU 2010 communicates with the RAM 2020, the program memory 2030, the auxiliary storage device 2040, and the input/output interface 2050 via a bus 2060.

The CPU 2010 is an example of a general-purpose processor. The RAM 2020 will be used for the CPU 2010 as a working memory. The RAM 2020 includes a volatile memory such as a synchronous dynamic random access memory (SDRAM). The program memory 2030 stores various programs including the learning monitoring program. As the program memory 2030, for example, ROM (Read-Only Memory), a portion of the auxiliary storage device 2040, or a combination thereof is used. The auxiliary storage device 2040 stores data non-temporarily. The auxiliary storage device 2040 includes a non-volatile memory such as HDD or SSD.

The input/output interface 2050 is an interface for connecting or communicating with other devices. The input/output interface 2050 is used, for example, for connecting or communicating between the learning apparatus 100 or the learning apparatus 800 and an input device (input unit), an output device, and a server (not shown).

Each program stored in the program memory 2030 includes a computer-executable instruction. When a program (computer-executable instruction) is executed by the CPU 2010, the program causes the CPU 2010 to execute predetermined processing. For example, when a load estimation program is executed by the CPU 2010, the program causes the CPU 2010 to execute a series of processing described for each part of the learning apparatus 100 or the learning apparatus 800.

The program may be provided to the computer 2000 in a state of being stored in a computer-readable storage medium. In this case, for example, the computer 2000 further includes a drive (not shown) that reads data from the storage medium and acquires the program from the storage medium. Examples of storage media include magnetic disks, optical disks (such as CD-ROM, CD-R, DVD-ROM, and DVD-R), magneto-optical disks (such as MO), and semiconductor memories. The program may be stored in a server on a communication network so that the computer 2000 downloads the program from the server using the input/output interface 2050.

The processing described in the embodiment is not limited to being performed by executing a program by a general-purpose hardware processor such as the CPU 2010, and may be performed by a dedicated hardware processor such as an application specific integrated circuit (ASIC). The term "processing circuit (processing unit)" includes at least one general-purpose hardware processor, at least one dedicated hardware processor, or a combination of at least one general-purpose hardware processor and at least one dedicated hardware processor. In the example shown in FIG. 20, the CPU 2010, the RAM 2020, and the program memory 2030 correspond to the processing circuits.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning apparatus comprising processing circuitry configured to:

acquire a plurality of learning samples to be learned and a plurality of target labels associated with the respective learning samples;

iteratively cause learning by a learning model which receives an input of a learning sample, among the plurality of learning samples, and outputs output data and a learning error, the learning error representing an error between the output data corresponding to the inputted learning sample and a target label, among the plurality of target labels; and display, based on a learning progress regarding the iterative learning of the learning model and a plurality of learning errors, a layout image in which at least some of the learning samples are arranged for each point in the learning progress and according to the learning errors.

2. The apparatus according to claim 1, wherein the learning progress is a number of times of the iterative learning.

3. The apparatus according to claim 1, wherein the at least some learning samples correspond to a plurality of representative values of the learning errors.

4. The apparatus according to claim 1, wherein the at least some learning samples correspond to a specific target label.

5. The apparatus according to claim 1, wherein the processing circuitry is further configured to arrange the at least some learning samples in a column direction in ascending or descending order of the learning error, and display the layout image in which the learning progress is associated in a row direction.

6. The apparatus according to claim 5, wherein the processing circuitry is further configured to perform emphasis processing based on the learning errors on the learning sample included in the layout image.

7. The apparatus according to claim 6, wherein the emphasis processing is at least one of a change in thickness of a frame line of the learning sample, among the plurality of learning samples, a change in color of the frame line of the learning sample, a superimposed display of a color map on the learning sample, and a change in display size of the learning sample.

8. The apparatus according to claim 5, wherein the processing circuitry is further configured to perform emphasis processing on a same learning sample on the layout image.

9. The apparatus according to claim 1, wherein the processing circuitry is further configured to display, as the layout image, an error map image that is associated in a column direction in ascending or descending order of the learning error and in which the learning progress is associated in a row direction.

10. The apparatus according to claim 9, wherein the processing circuitry is further configured to perform emphasis processing on a position corresponding to a same learning sample on the error map image.

11. The apparatus according to claim 1, wherein the processing circuitry is further configured to:
set a boundary line on the layout image; and
exclude one or more learning samples designated by the set boundary line from the learning samples to cause learning by the learning model.

12. The apparatus according to claim 11, wherein the processing circuitry is further configured to:
determine an arbitrary time point in the learning progress based on the set boundary line and
exclude the one or more learning samples to restart iterative learning from the arbitrary time point.

13. The apparatus according to claim 11, wherein the boundary line is at least one of a straight line, a curved line, and a plane figure.

14. The apparatus according to claim 11, wherein the processing circuitry is further configured to:
set a range on the layout image; and
further display details of one or more learning samples corresponding to the set range.

15. The apparatus according to claim 1, wherein the processing circuitry is further configured to:
set a range on the layout image; and
further display details of one or more learning samples corresponding to the set range.

16. The apparatus according to claim 1, wherein the learning model is a neural network model.

17. A learning method comprising:
acquiring a plurality of learning samples to be learned and a plurality of target labels associated with the respective learning samples;
iteratively cause learning by a learning model which receives an input of a learning sample, among the plurality of learning sample, and outputs output data and a learning error, the learning error representing an error between the output data corresponding to the inputted learning sample and a target label, among the plurality of target labels; and
displaying, based on a learning progress regarding the iterative learning of the learning model and a plurality of learning errors, a layout image in which at least some of the learning samples are arranged for each point in the learning progress and according to the learning errors.

18. A non-transitory computer-readable storage medium storing a program for causing a computer to execute processing comprising:
acquiring a plurality of learning samples to be learned and a plurality of target labels associated with the respective learning samples;
iteratively cause learning by a learning model which receives an input of a learning sample, among the plurality of learning sample, and outputs output data and a learning error, the learning error representing an error between the output data corresponding to the inputted learning sample and a target label, among the plurality of target labels; and
displaying, based on a learning progress regarding the iterative learning of the learning model and a plurality of learning errors, a layout image in which at least some of the learning samples are arranged for each point in the learning progress and according to the learning errors.

* * * * *